United States Patent Office 2,820,925
Patented Jan. 21, 1958

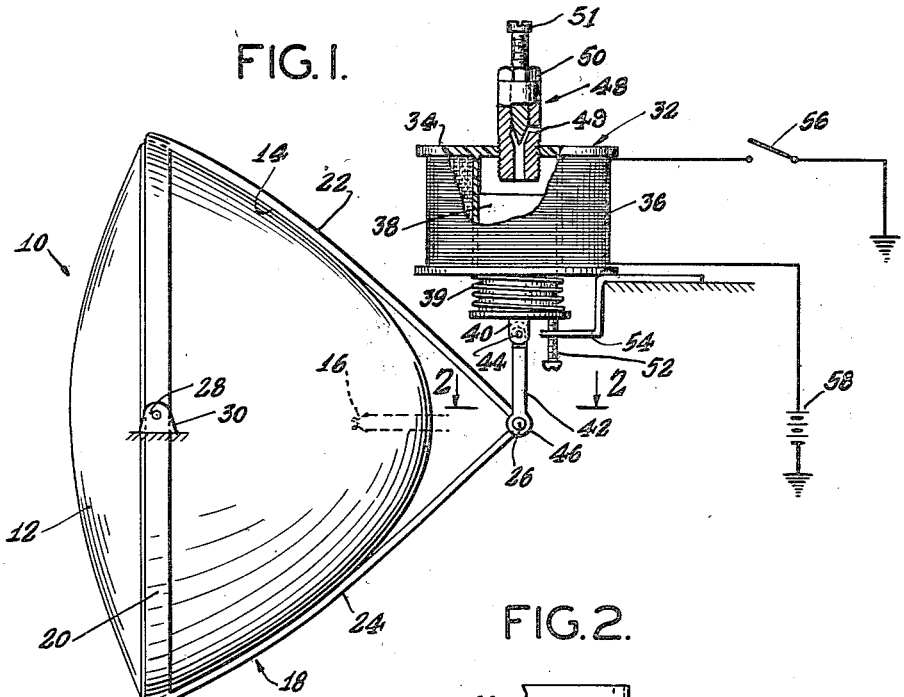
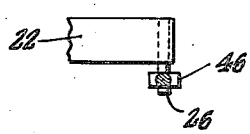
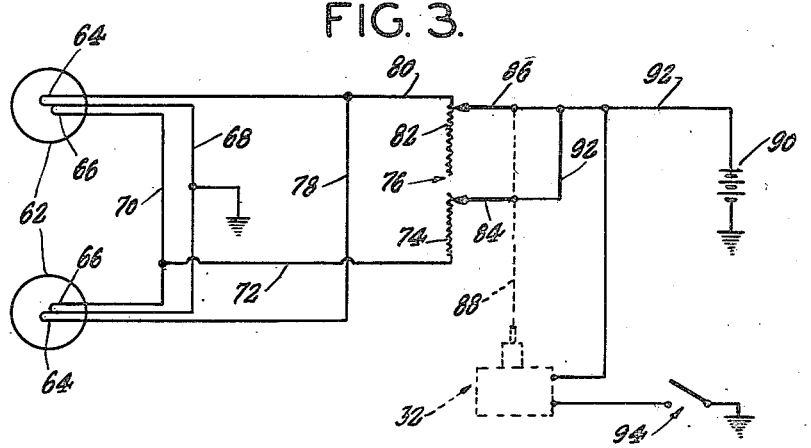
INVENTOR.
ERNEST H. SCHMIDT, JR.

2,820,925

AUTOMOBILE HEADLIGHT CONTROL DEVICES

Ernest H. Schmidt, Jr., New York, N. Y.

Application February 11, 1954, Serial No. 409,750

6 Claims. (Cl. 315—83)

This invention relates to automobile headlight control systems and is more particularly related to improvements in systems for the automatic control of vehicular headlights in response to light impinging upon the vehicle from another vehicle such as is disclosed in applicant's U. S. Patent No. 2,476,389, issued July 19, 1949.

Presently employed light lowering, or so-called "dimming" systems whether manually operated or automatic, switch the vehicle headlight system from high beam to low beam, or vice versa, practically instantaneously, so that the lighted area in front of the vehicle changes abruptly. This abrupt switching of the lighted area, especially when often repeated, is fatiguing to the eyes, and is therefore a detrimental factor in the present exceedingly high night automobile accident rate.

Moreover, it is not unusual for drivers to fail to dim their headlights whenever they should because of this fatiguing effect.

When lights are controlled automatically, by means, for instance, of the device described in the above-mentioned patent, there is no choice as to whether or not the lights shall be dimmed, as the light from an oncoming car will properly dim or lower the headlights. For this reason the headlights are usually dimmed more often, as they should be for night driving safety. At the same time, however, increased eye fatigue due to the increased number of abrupt changes tends to accentuate the stress of night driving.

Accordingly, it is an object of this invention to provide a vehicle "dimming" system that changes its lighted area gradually when controlled from high beam position to low beam position, or vice versa.

It is another object of this invention to provide a vehicle headlight dimming system wherein the elapsed time for the change from high beam position to low beam position or vice versa is adjustable.

Another object is to provide a lighting system of the character described wherein the headlights, when controlled, are gradually moved, so that the lighted area is slowly changed from one beam position to another.

The foregoing and other objects will be more fully apparent from the following description taken in connection with the accompanying drawing, wherein;

Fig. 1 is an elevational view of a solenoid adapted to move a vehicle headlamp from one position to another according to the invention, Fig. 2 is a cross-sectional view taken along the line 2—2 of Fig. 1, and Fig. 3 is an electrical schematic diagram of an alternative way of lowering headlights according to the invention.

In Fig. 1 of the drawing, the number 10 represents one of the usual pair of automobile headlights. It may, for example, be of the kind wherein the front lens 12, reflector 14 and filament 16 are of unitary structure. The headlight 10 is supported in a frame 18 comprising a peripheral ring clamp 20 and a pair of inclined, vertically extending, members 22, 24, each fixed at one end to the clamp at diametrically opposite positions thereof. The other ends of the inclined members are securely fixed, as by welding, to the opposite sides of a horizontal pin 26 (see Fig. 2).

The clamp 20 is provided with a pair of outwardly extending pins 28 (only one shown), coaxial with the horizontal diameter of said clamp.

The pins 28 are journalled in a pair of ears 30 (only one shown) fixed relative to the car frame, whereby the headlight 10 can be tiltably moved from one position to another by a solenoid device 32.

The solenoid 32 comprises a non-magnetic spool 34 having an electrical winding 36 and providing a central cylindrical opening within which is slidably disposed a magnetic plunger 38. The outer end of the plunger 38 is flanged to retain one end of a circumjacent spring 39, the other end of which is constrained against the underside of the spool 34. The outer end of plunger 38 is further provided with a downwardly extending central lug 40, vertically slotted and cross-drilled to receive the flattened and drilled upper end of a link member 42. The lug 40 and link member 42 are interconnected by a pivot pin 44.

The lower end 46 of the link member 42 is enlarged and provided with a horizontally drilled opening within which the pin 26 is journalled. It will therefore be evident that as the plunger 38 moves upwardly in the solenoid 32, the headlight will be tilted in a counter-clockwise direction, the direction for lowering the beam or "dimming" the headlight.

Adjustable stop means is provided to limit the upward and downward movement of the plunger 38, the same comprising a control member 48 threaded at its lower end in a central opening in the upper end of the spool 34. The member 48 is provided with a hexagonal upper end portion 50 whereby it can be turned in the spool to adjust the vertical position of its inner end, which serves as a stop to limit upward motion of the plunger. Downward motion of the plunger is limited by abutment with the end of a screw 52, adjustable in a bracket 54. The bracket is fixed with respect to the spool 34 and the car frame. The spring 39 is biased to urge the plunger outwardly, whereby the headlight is normally in the high beam position. The winding 36 is connected in series with a "dimming" switch 56 and the car battery 58 through ground. Although the switch 56 preferably is the relay-controlled switch of the patented automatic headlight dimming system hereinabove referred to, it could also be a manually operated switch. When the switch is closed, the solenoid 32 will become energized and draw in its plunger 38 against the force of spring 39 until the plunger abuts the control member 48.

Adjustable means are provided for controlling the length of time it takes for the plunger to move from one position to another, the same comprising an air vent 49 in the control member 48. The vent 49 is in communication with the interior of the spool 34 through an adjustable valve comprising the conical end of a screw 51 in the control member 48. The plunger 38 together with the inner cylindrical surface of the spool 34 therefore provide dashpot action.

Fig. 3 illustrates an alternative embodiment of the invention wherein the solenoid 32 is utilized to control circuit elements operative gradually to change energization from high beam filament to low beam filament and vice versa in a two filament headlight system. In the figure, headlights 62 are of the type having individual high and low beam filaments 64 and 66 respectively. The common terminals of each of the pair of filaments 64 and 66 are interconnected and grounded as by a wire 68. The remaining terminals of the low beam filaments 66 are interconnected by a wire 70 and further connected by a wire 72 to the lower end of one resistance element 74 of a dual rheostat 76. The remaining terminals of the high beam filaments 64 are interconnected by a wire 78 and further connected by a wire 80 to the upper end of the other resistance element 82 of the dual rheostat 76. Slidable contacts 84 and 86 of the resistance elements 74 and 82 respectively are mechanically ganged, as indicated by the dotted line 88, to be simultaneously operated by movement of the plunger of the solenoid 32. The slidable contacts 84 and 86 are both connected to one terminal of the car battery 90 as by a wire 92. The remaining terminal of the car battery is grounded. One terminal of the energization coil of the solenoid 32 is connected to the ungrounded terminal of the battery 90 through the wire 92. The other terminal of the coil is connected through the dimming switch 94 to ground.

With the slidable contacts 84 and 86 in the positions along their respective resistance elements as shown in the drawing, it will be evident that current can flow directly from the grounded battery 90, through wires 92, 86, 80, and 78 to the high beam filaments 64 and thence through wire 68 to ground. The resistance element 74 is of great enough ohmic value that substantially no current will flow therethrough when its contact is in the full resistance position as illustrated. The headlights 62 therefore will be on high beam. Upon closure of the switch 94 for "dimming" the lights, the solenoid 32 draws in its plunger, in the manner hereinabove described, so that the contact wires 84, 86 mechanically connected therewith are gradually moved to their lowermost positions, whereupon direct connection is established through the wires 84 and 72 to energize the low beam filaments 66. The full resistance of resistance element 82 here again is great enough to limit current to the high beam filaments 64 to a negligible value when the lights are "dimmed." As the sliders move from one position to the other, however, the light from one corresponding pair of filaments will gradually diminish, while the other increases to full brilliancy, so that in effect there will be a gradual change in the area lighted in front of the car. The length of the time required for the change is determined by the adjustment of the solenoid as hereinabove described in connection with the embodiment illustrated in Fig. 1. It has been determined that this length of time in ordinary present-day automobile driving beam systems must be at least one-half of a second to be effective.

What is claimed is:

1. In an automobile headlight dimming system, the combination comprising a headlamp providing a beam of light and solenoid controlled means associated with said headlamp for effectively changing the direction of said beam of light, said solenoid controlled means comprising mechanism for controlling the time required for said changing of direction of said beam of light, from a minimum length of time of one-half a second to a greater length of time.

2. The invention as defined in claim 1, wherein said solenoid controlled means comprises a movable plunger cooperatively linked with said headlamp, a cylinder within one end of which said plunger is slidably fitted, and wherein said controlling mechanism comprises a vent in the other end of said cylinder and means to control the size of opening of said vent.

3. The invention as defined in claim 1, wherein said headlamp comprises a high and a low beam filament, and wherein said solenoid controlled means comprises a pair of variable resistors, one each in series with said filaments, said resistors being arranged for simultaneous operation wherein one resistance is at full setting while the other is at minimum setting, and a source of current supply, said respective filaments and series resistors being in circuit with said source, whereby when said relay is actuated one filament is gradually energized while the other is gradually deenergized to effect a moving beam of light from said headlight.

4. The invention as defined in claim 1, wherein said direction changing means comprises a frame member for supporting said headlight, pivot mechanism tiltably supporting said frame, a solenoid having a plunger, and link mechanism interconnecting said plunger and said frame, whereby said headlight is tilted when said solenoid is actuated.

5. In an automobile headlight beam lowering system, the combination comprising a headlight movable between two positions, spring bias means normally holding said headlight in one of said positions, electrically controlled means operative to move said headlight to the other of said positions, and adjustable means for controlling the length of time required for the movement of said headlight from said one position to the other, from a minimum length of time of one-half a second to a greater length of time.

6. In an automobile headlight beam control system, the combination comprising a headlamp operable to cast a light beam for night driving, means controlling said headlamp to move a light beam cast by said headlamp from one position to another, and adjustable means for automatically controlling the length of time required for moving the light beam cast by said headlamp from one position to another from a minimum length of time of about one-half second to a greater length of time, whereby a great enough time interval can be effected in moving from one beam position to another to minimize eye fatigue due to repeated beam switching.

References Cited in the file of this patent

UNITED STATES PATENTS

| | | |
|---|---|---|
| 1,269,426 | Green | June 11, 1918 |
| 1,686,452 | Hoefler | Oct. 2, 1928 |
| 2,202,922 | Quinlivan | June 4, 1940 |
| 2,375,677 | Moore | May 8, 1945 |
| 2,476,389 | Schmidt | July 19, 1949 |

FOREIGN PATENTS

| | | |
|---|---|---|
| 113,853 | Switzerland | Mar. 1, 1926 |